(12) United States Patent
Oyama

(10) Patent No.: US 10,520,959 B2
(45) Date of Patent: Dec. 31, 2019

(54) TEMPERATURE CONTROL DEVICE AND AUTO-TUNING METHOD

(71) Applicant: OMRON Corporation, Kyoto (JP)

(72) Inventor: Satoshi Oyama, Yasu (JP)

(73) Assignee: OMRON Corporation, Kyoto (JP)

( * ) Notice: Subject to any disclaimer, the term of this patent is extended or adjusted under 35 U.S.C. 154(b) by 211 days.

(21) Appl. No.: 15/744,057

(22) PCT Filed: Sep. 28, 2016

(86) PCT No.: PCT/JP2016/078700
§ 371 (c)(1),
(2) Date: Jan. 12, 2018

(87) PCT Pub. No.: WO2017/061321
PCT Pub. Date: Apr. 13, 2017

(65) Prior Publication Data
US 2018/0203476 A1 Jul. 19, 2018

(30) Foreign Application Priority Data

Oct. 7, 2015 (JP) .................. 2015-199774

(51) Int. Cl.
*G05D 23/00* (2006.01)
*G05B 13/00* (2006.01)
(Continued)

(52) U.S. Cl.
CPC ....... *G05D 23/2451* (2013.01); *G05B 13/024* (2013.01); *G05B 13/047* (2013.01);
(Continued)

(58) Field of Classification Search
CPC .......... G05D 23/2451; G05D 23/1923; G05D 23/1931; G05B 13/024; G05B 13/047
See application file for complete search history.

(56) References Cited

U.S. PATENT DOCUMENTS 2,140,933 A    12/1938   Dennis
3,838,810 A * 10/1974   McMann .................. F24D 5/02
                                                            236/9 R
(Continued)

FOREIGN PATENT DOCUMENTS

EP    0533498    3/1993
EP    1659461    5/2006
(Continued)

OTHER PUBLICATIONS

"International Search Report (Form PCT/ISA/210) of PCT/JP2016/078700", dated Dec. 6, 2016, with English translation thereof, pp. 1-2.
(Continued)

*Primary Examiner* — Ronald D Hartman, Jr.
(74) *Attorney, Agent, or Firm* — JCIPRNET

(57) ABSTRACT

A temperature control device comprises: an operation amount upper limit setting part that sets an upper limit of an operation amount of a heater; and a temperature change rate comparing part that determines, in every prescribed time period, whether an actual measured change rate of the temperature of a body-to-be-heated with respect to time is outside a prescribed range that includes a target rate of change. The operation amount upper limit setting part sets the upper limit to a preset initial value when operation of the heater is started toward the target temperature, and updates the upper limit, in a period until the temperature of the body-to-be-heated reaches the target temperature, such that the difference between an actual measured temperature and a temperature locus that is represented using the target rate of change becomes smaller when it is determined that the actual measured change rate is outside the prescribed range.

20 Claims, 8 Drawing Sheets

(51) Int. Cl.
*G05D 23/24* (2006.01)
*G05B 13/02* (2006.01)
*G05B 13/04* (2006.01)
*G05D 23/19* (2006.01)
*G05D 23/275* (2006.01)

(52) U.S. Cl.
CPC ..... G05D 23/1923 (2013.01); G05D 23/1931 (2013.01); *G05D 23/1951* (2013.01); *G05D 23/27543* (2013.01)

(56) References Cited

U.S. PATENT DOCUMENTS

| | | | | |
|---|---|---|---|---|
| 3,951,337 | A * | 4/1976 | Reiner | G05D 23/1919 236/91 F |
| 4,031,950 | A * | 6/1977 | Shultz | G05D 23/1931 165/259 |
| 4,199,102 | A * | 4/1980 | Paul | F24D 19/1003 165/256 |
| 4,379,484 | A * | 4/1983 | Lom | F25B 49/02 165/251 |
| 4,405,855 | A * | 9/1983 | Kolle | F24H 9/2014 219/501 |
| 4,564,748 | A * | 1/1986 | Gupton | A61M 16/1075 219/497 |
| 4,734,872 | A * | 3/1988 | Eager | G01R 31/2891 374/135 |
| 5,335,708 | A * | 8/1994 | Murakami | F28F 27/02 165/297 |
| 5,926,390 | A * | 7/1999 | Koyama | G05D 23/1931 165/268 |
| 2003/0121905 | A1* | 7/2003 | Nanno | G05B 11/32 219/494 |
| 2008/0170947 | A1* | 7/2008 | Sutardja | G06F 1/206 417/32 |
| 2016/0209069 | A1* | 7/2016 | Rafiq | G05D 23/1931 |

FOREIGN PATENT DOCUMENTS

| | | |
|---|---|---|
| JP | S61233816 | 10/1986 |
| JP | 2011090609 | 5/2011 |
| JP | 2011090610 | 5/2011 |
| JP | 2014211385 | 11/2014 |

OTHER PUBLICATIONS

"Written Opinion of the International Searching Authority (Form PCT/ISA/237)" of PCT/JP2016/078700, dated Dec. 6, 2016,, with English translation thereof, pp. 1-6.

"Search Report of Europe Counterpart Application", dated May 28, 2019, p. 1-p. 7.

* cited by examiner

| TARGET TEMPERATURE [°C] | TEMPERATURE RISE TIME [SECONDS] | P [%] | I [SECONDS] | D [SECONDS] | OPERATION AMOUNT UPPER LIMIT | OPERATION AMOUNT LOWER LIMIT |
|---|---|---|---|---|---|---|
| 50 | (90) | - | - | - | - | 0 |
| 60 | (90) | - | - | - | - | 0 |
| 70 | (90) | - | - | - | - | 0 |
| 80 | (90) | - | - | - | - | 0 |

FIG. 6A

| TARGET TEMPERATURE [°C] | TEMPERATURE RISE TIME [SECONDS] | P [%] | I [SECONDS] | D [SECONDS] | OPERATION AMOUNT UPPER LIMIT | OPERATION AMOUNT LOWER LIMIT |
|---|---|---|---|---|---|---|
| 50 | (90) | 5.24 | 10.0 | 1.6 | 10 | 0 |
| 60 | (90) | 4.19 | 10.0 | 1.6 | 15 | 0 |
| 70 | (90) | 3.67 | 10.0 | 1.6 | 20 | 0 |
| 80 | (90) | 2.93 | 9.0 | 1.5 | 25 | 0 |

FIG. 6B

TEMPERATURE CONTROL DEVICE AND AUTO-TUNING METHOD

CROSS-REFERENCE TO RELATED APPLICATION

This application is a 371 application of the International PCT application serial No. PCT/JP2016/078700, filed on Sep. 28, 2016, which claims the priority benefits of Japan Patent Application No. 2015-199774, filed on Oct. 7, 2015. The entirety of the above-mentioned patent applications is hereby incorporated by reference herein and made a part of this specification.

TECHNICAL FIELD

The present invention relates to a temperature control device and an auto-tuning method.

BACKGROUND ART

Conventionally, technologies for controlling the temperature adjustment of heated bodies such as a reflow furnace and a thermostatic bath are known. While a heated body has a different heat capacity according to its kind, the heated body is frequently heated using one heater having a large power rating as a heating body. This is because it is difficult in view of cost to introduce heaters of various power ratings in accordance with heated bodies having different heat capacities. In addition, it is preferable to control the heating of a heated body such that overshoot or hunting does not occur, and such technologies are disclosed in Patent Literatures 1 and 2.

More specifically, Patent Literature 1 discloses a temperature control device executing auto tuning (AT) of a limit cycle method for setting a PID parameter by generating a limit cycle for outputting an operation amount with a constant amplitude to a power conditioner supplying power to a heater. This temperature control device executes AT of a limit cycle method for each of upper limit values of a plurality of operation amounts registered in advance and stores the amplitude of temperature that is a control target at the time of executing AT for each of the upper limit values of the plurality of operation amounts. In addition, a ratio between amplitudes having close conditions of the upper limit values of the operation amounts is calculated. Then, the heater is determined to be out of the rated range for an upper limit value of the operation amount or more at a time when the ratio is smaller than a threshold and sets the upper limit value of the operation amount at that time as an upper limit value of the operation amount at the time of executing a normal PID control operation. Meanwhile, Patent Literature 2 discloses a technology for setting an upper limit value of the heating value of a heater on the basis of the air temperature inside a casing of a thermostatic bath.

CITATION LIST

Patent Literature

[Patent Literature 1]
Japanese Patent Application Laid-Open (JP-A) No. 2011-90609 (Published on May 6, 2011)
[Patent Literature 2]
Japanese Patent Application Laid-Open (JP-A) No. 2014-211385 (Published on Nov. 13, 2014)

SUMMARY OF INVENTION

Technical Problem

However, in the technology disclosed in Patent Literature 1, the upper limit value of the operation amount is set such that the occurrence of integration windup can be avoided even in a case in which the rated ranges of the power conditioner and the heater do not match each other, and the upper limit value of the operation amount is not set to acquire a desired temperature change (temperature trajectory) with respect to time. For this reason, there is a problem in that the temperature cannot be controlled to acquire a desired temperature trajectory.

In addition, in Patent Literature 2, while it is disclosed that the upper limit value of the heating value of a heater is determined on the basis of an air temperature difference between the inside and the outside of a casing, a temperature change with respect to time up to a target temperature is not considered, and, similar to Patent Literature 1, there is a problem in that the temperature cannot be controlled to acquire a desired temperature trajectory.

The present invention made is in view of the problems described above, and an object thereof is to realize a temperature control device and an auto-tuning method capable of controlling the temperature of a heated body in a state close to a desired temperature trajectory.

Solution to Problem

In order to solve the problems described above, according to the present invention, there is provided a temperature control device that is a temperature control device that controls a temperature of a heated body of a heating system heating the heated body using a heating body in accordance with a control parameter and includes: a target setting part that sets a target temperature and a target change rate of a temperature with respect to time before the temperature arrives at the target temperature; an upper limit value setting part that sets an upper limit value of an operation amount of the heating body; a heating processing part that operates the heating body at the upper limit value set by the upper limit value setting part such that the temperature of the heated body arrives at the target temperature; and a determination part that executes a determination process of determining whether or not a deviation amount representing a deviation between an actual measured temperature of the heated body and a temperature trajectory represented by the target change rate is outside a predetermined range for every predetermined time, wherein the upper limit value setting part sets an initial value set in advance as the upper limit value in a case in which the heating processing part starts an operation of the heating body toward the target temperature, and in a case in which the deviation amount is determined to be outside the predetermined range before the temperature of the heated body arrives at the target temperature, updates the upper limit value such that the deviation amount is decreased, the temperature control device further includes a parameter setting part that sets the upper limit value set by the upper limit value setting part when the temperature of the heated body arrives at the target temperature as the control parameter.

In addition, the initial value set in advance may be a value set by an operator or a value set by the temperature control device when auto-tuning setting control parameters is executed.

In addition, in order to solve the problems described above, there is provided an auto-tuning method for setting a control parameter used for controlling a temperature of a heated body of a heating system heating the heated body using a heating body, the method including: a target setting step in which a target temperature and a target change rate of a temperature with respect to time in a period before the temperature arrives at the target temperature are set; an upper limit value setting step in which an upper limit value of an operation amount of the heating body is set; a heating step in which the heating body is operated at the upper limit value set in the upper limit value setting step such that the temperature of the heated body arrives at the target temperature; and a determination step in which it is determined whether or not a deviation amount representing a deviation between an actual measured temperature of the heated body and a temperature trajectory represented by the target change rate is outside a predetermined range for every predetermined time, wherein, in the upper limit value setting step, in a case in which the heating body is started to be operated toward the target temperature, an initial value set in advance is set as the upper limit value, and in a case in which the deviation amount is determined to be outside the predetermined range before the temperature of the heated body arrives at the target temperature, the upper limit value is updated such that the deviation amount is decreased, the auto-tuning method further includes a parameter setting step in which the upper limit value set when the temperature of the heated body arrives at the target temperature is set as the control parameter.

Advantageous Effects of Invention

According to the present invention, an effect of being capable of controlling the temperature of a heated body in a state close to a desired temperature trajectory is acquired.

BRIEF DESCRIPTION OF THE DRAWINGS

FIGS. 6A and 6B are diagrams illustrating examples of an AT screen according to this embodiment.

DESCRIPTION OF EMBODIMENTS

Hereinafter, an embodiment of the present invention will be described with reference to the drawings.

<Entire Configuration of Heating Control System>

Figure 1:
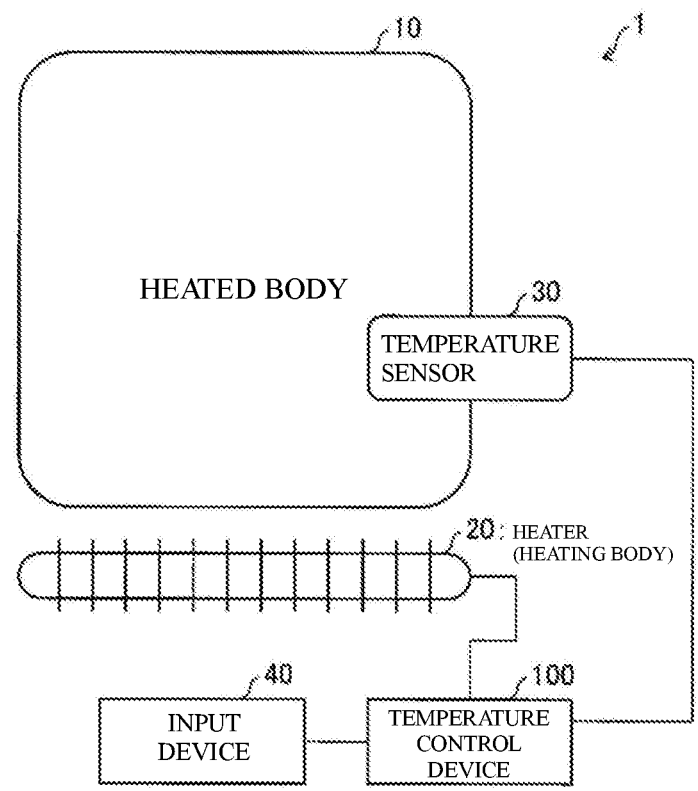
FIG. 1 is a diagram illustrating one example of the entire configuration of a heating control system according to this embodiment.

FIG. 1 is a diagram illustrating one example of the entire configuration of a heating control system according to this embodiment. As illustrated in FIG. 1, the heating control system (heating system) 1 includes: a heated body 10; a heater 20 serving as a heating body used for heating the heated body 10; a temperature control device 100 that controls the temperature of the heated body 10 by operating the heater 20 in accordance with a control parameter; a temperature sensor 30 that is electrically connected to the temperature control device 100 and detects the temperature (actually measured temperature) of the heated body 10; and an input device 40 that receives various parameters to be input to the temperature control device 100.

The input device 40, for example, is a personal computer, a programmable terminal, or the like and receives various parameters on an AT screen in accordance with a user's operation. More specifically, the input device 40 receives a target temperature and a target time until the temperature reaches the target temperature.

In addition, the input device 40 may receive a plurality of target temperatures and target times until the temperature reaches at the target temperatures representing a desired temperature trajectory. In other words, the input device 40 may receive first to N-th (here, N is an integer of two or more) target temperatures, a first target time until the arrival at the first target temperature from an initial state, and a k-th target time until the arrival at a k-th target temperature from the (k−1)-th (here, k is an integer of 2 to N) target temperature.

Figure 2:
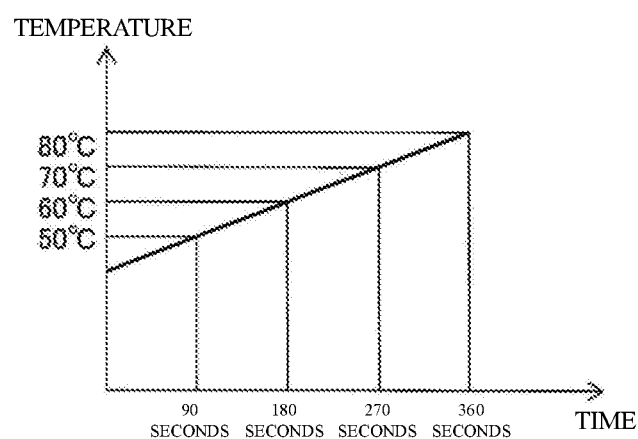
FIG. 2 is a diagram illustrating one example of a desired temperature trajectory.

FIG. 2 is a diagram illustrating one example of a desired temperature trajectory. In a case in which control for a temperature trajectory as illustrated in FIG. 2 is desired, a user may input a first target temperature: 50° C. and a first target time: 90 seconds, a second target temperature: 60° C. and a second target time: 90 seconds, a third target temperature: 70° C. and a third target time: 90 seconds, and a fourth target temperature: 80° C. and a fourth target time: 90 seconds to the input device 40.

<Configuration of Temperature Control Device>

As the temperature control device 100, for example, a general temperature regulator or a programmable controller may be used. The temperature control device 100 controls power to be supplied to the heater 20 such that the temperature of the heated body 10 arrives at the target temperature on the basis of a detected value of the temperature sensor 30, thereby operating the heater 20.

Figure 3:
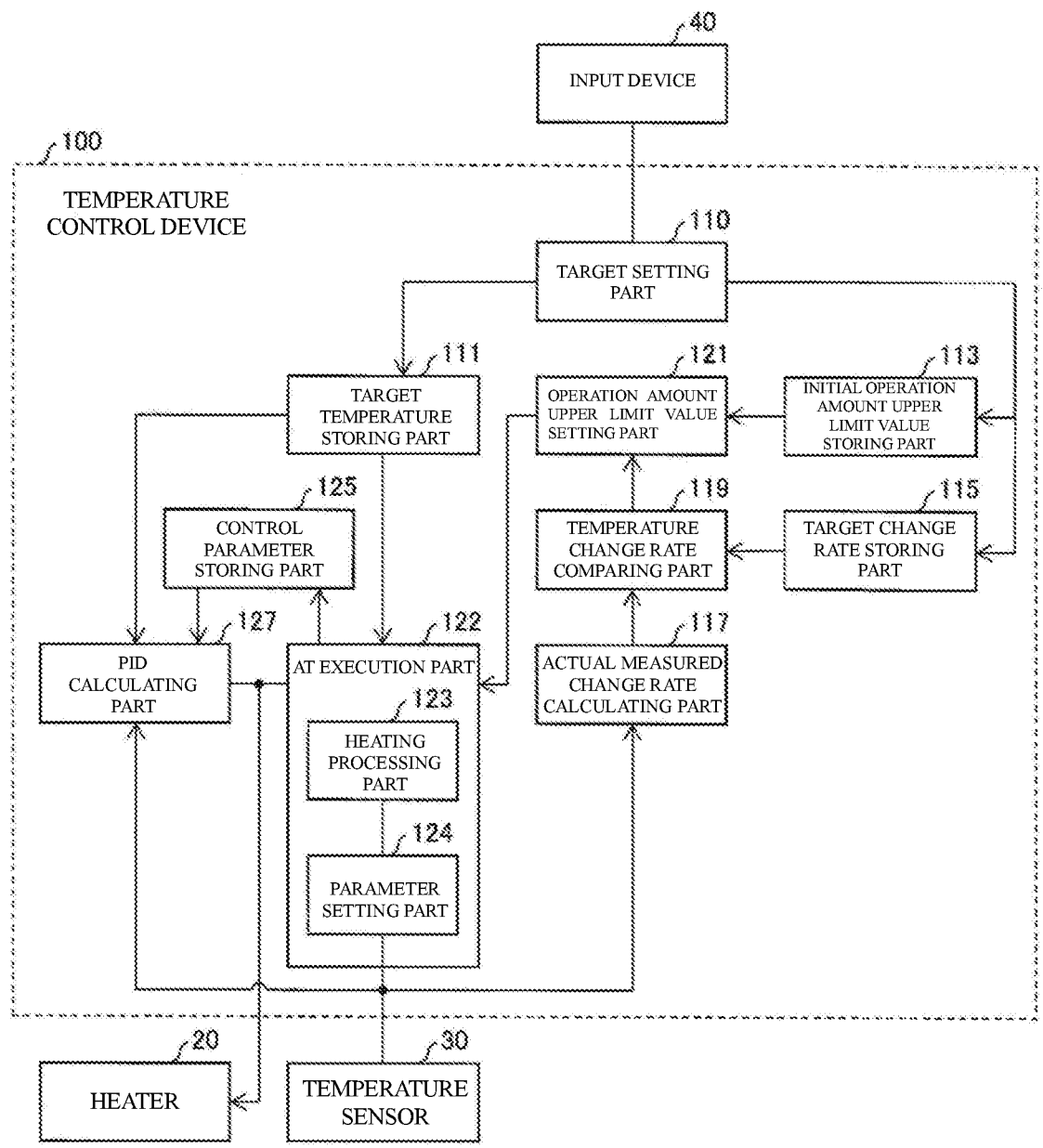
FIG. 3 is a functional block diagram illustrating one example of the configuration included in a temperature control device according to this embodiment.

FIG. 3 is a functional block diagram illustrating one example of the configuration included in the temperature control device according to this embodiment. As illustrated in FIG. 3, the temperature control device 100 includes: a target setting part 110; a target temperature storing part 111; an initial operation amount upper limit value storing part 113; a target change rate storing part 115, an actual measured change rate calculating part 117; a temperature change rate comparing part 119; an operation amount upper limit value setting part (upper limit value setting part) 121; an AT execution part 122; a control parameter storing part 125; and a PID calculating part 127.

The target setting part 110 receives various parameters (hereinafter referred to as a target temperature and a target time) input to the input device 40. The target setting part 110 stores the received target temperature in the target temperature storing part 111. In a case in which a plurality of target temperatures are received, the target setting part 110 stores each target temperature in the target temperature storing part 111 together with a number representing the order.

In addition, the target setting part 110 acquires a target change rate of the temperature with respect to the time before the temperature arrives at the target temperature by dividing a difference between the temperature (for example, the actual temperature) of the initial state and a received target temperature by the target time. The target setting part 110 stores the acquired target change rate in the target change rate storing part 115. The target change rate represents a desired temperature trajectory.

In addition, in a case in which a plurality of target temperatures are received, the target setting part 110 acquires a first target change rate using the method described above on the basis of the first target temperature and the first target time and may acquire second and subsequent target change rates as below. In other words, the target setting part 110 acquires a k-th target change rate by dividing a difference between a (k−1)-th (here, k is an integer of 2 or more) and a k-th target temperature by a k-th target time and may store each target change rate and a number representing the order in the target temperature storing part 111.

In addition, the target setting part 110 stores a default set value (for example, 5% or 10%) in the initial operation amount upper limit value storing part 113 as an initial operation amount upper limit value that is an upper limit value of the operation amount of the heater 20.

The AT execution part 122 executes an auto tuning process (AT process) in accordance with a direction from a user and sets various control parameters for operating the heater 20. Here, the control parameters include an upper limit value and a lower limit value of the operation amount of the heater 20 and PID parameters. The PID parameters are a P value that is a parameter of a proportional operation, an I value that is a parameter of an integral action, and a D value that is a parameter of a derivative action. The AT execution part 122 includes a heating processing part 123 and a parameter setting part 124.

The heating processing part 123 operates the heater 20 by using an upper limit value of an operation amount output from the operation amount upper limit value setting part 121 and a lower limit value (for example, 0%) of the operation amount that is set in advance. More specifically, the heating processing part 123 compares a target temperature stored in the target temperature storing part 111 with an actual measured temperature output from the temperature sensor 30. The heating processing part 123 operates the heater 20 at an upper limit value in a case in which the actual measured temperature is lower than the target temperature and operates the heater 20 at a lower limit value in a case in which the actual measured temperature is the target temperature or more. Here, the operation of the heater 20 at the upper limit value means supply of power corresponding to the upper limit value of the operation amount to the heater 20, and the operation of the heater 20 at the lower limit value means supply of power corresponding to the lower limit value of the operation amount (which may be 0 W) to the heater 20.

When the temperature of the heated body 10 arrives at the target temperature, the heating processing part 123 operates the heater 20 under a condition for setting the PID parameters only for a time required for the parameter setting part 124 to set the PID parameters (a PID parameter setting period). At this time, the heating processing part 123 operates the heater 20 by using the upper limit value set in the operation amount upper limit value setting part 121 at the time when the temperature of the heated body 10 arrives at the target temperature and the lower limit value set in advance.

In addition, in a case in which the target temperature storing part 111 stores a plurality of target temperatures, the heating processing part 123 reads the target temperatures in order of number and operates the heater 20 to arrive at the read target temperature. Then, when the PID parameter setting period elapses after the arrival at the target temperature, the heating processing part 123 reads a target temperature of the next number from the target temperature storing part 111 and executes a similar process.

The parameter setting part 124 sets various control parameters used for controlling the heater 20 and stores the control parameters in the control parameter storing part 125. In a case in which the target temperature storing part 111 stores a plurality of target temperatures, the parameter setting part 124 sets the control parameters for each target temperature. In addition, the parameter setting part 124 outputs the set control parameters to the input device 40 to be displayed on an AT screen of the input device 40.

First, the setting of the upper limit value and the lower limit value of the operation amount of the heater 20 will be described, and the setting of the PID parameters will be described later. In this embodiment, the parameter setting part 124 stores a value (for example, 0%) set in advance for the lower limit value of the operation amount of the heater 20 in the control parameter storing part 125. In addition, the parameter setting part 124 stores a value set by the operation amount upper limit value setting part 121 at the time of arrival at the target temperature in the control parameter storing part 125 as the upper limit value of the operation amount of the heater 20.

While the AT execution part 122 executes the AT process, the actual measured change rate calculating part 117 calculates a change rate (actual measured change rate) with respect to the time on the basis of the actual measured temperature detected by the temperature sensor 30. In this embodiment, every time a predetermined time (for example, 20 seconds, 30 seconds, one minute, or the like) elapses after the heating processing part 123 starts the operation of the heater 20 toward the target temperature, the actual measured change rate calculating part 117 calculates an actual measured change rate for the predetermined time. The actual measured change rate calculating part 117 outputs the calculated actual measured change rate to the temperature change rate comparing part 119.

The temperature change rate comparing part 119 determines whether or not a deviation amount representing a deviation between the actual measured temperature of the heated body 10 and a temperature trajectory represented as a target change rate is outside a predetermined range. In this embodiment, the temperature change rate comparing part 119 determines whether or not the difference is outside the predetermined range by using a difference between the actual measured change rate calculated by the actual measured change rate calculating part 117 and the target change rate stored in the target change rate storing part 115 as the deviation amount. For example, it is determined whether or not the actual measured change rate is outside the range of ±2° C. with respect to the target change rate (for example, 10° C./minute). In a case in which the actual measured change rate is within the range, information indicating the same is output to the operation amount upper limit value setting part 121. On the other hand, in a case in which the actual measured change rate is outside the range, information indicating the same is output to the operation amount upper limit value setting part 121.

In addition, the temperature change rate comparing part 119 may use a ratio between the actual measured change rate and the target change rate as the deviation amount representing a deviation between the actual measured temperature and the temperature trajectory represented by target change rates instead of a difference between the actual measured change rate and the target change rate.

In addition, in a case in which the target temperature storing part 111 stores a plurality of target temperatures, the temperature change rate comparing part 119 does not execute the comparison process described above during a period until the heating processing part 123 starts the operation of the heater 20 toward the k-th target temperature after the temperature of the heated body 10 arrives at the (k−1)-th target temperature (in other words, the PID parameter setting period described above).

The operation amount upper limit value setting part 121 sets the upper limit value of the operation amount of the heater 20. Information indicating that the deviation amount described above (in this embodiment, a difference between the actual measured change rate and the target change rate) is within the predetermined range or outside the predetermined range is input to the operation amount upper limit value setting part 121 from the temperature change rate comparing part 119.

At a time point at which the AT execution part 122 starts the AT process, the operation amount upper limit value setting part 121 sets a value stored in the initial operation amount upper limit value storing part 113 as the upper limit value of the operation amount.

Then, in a case in which the information indicating that the deviation amount described above (in this embodiment, a difference between the actual measured change rate and the target change rate) is within the predetermined range is input, the operation amount upper limit value setting part 121 does not change the upper limit value of the operation amount.

On the other hand, in a case in which the information indicating that the deviation amount described above is outside the predetermined range is input, the operation amount upper limit value setting part 121 updates the upper limit value of the operation amount such that the deviation amount is decreased. More specifically, the operation amount upper limit value setting part 121 determines whether or not the actual measured change rate is higher than the target change rate. In a case in which the actual measured change rate is lower than the target change rate, the operation amount upper limit value setting part 121 sets a value acquired by increasing the current upper limit value by a predetermined amount (for example, 5% or 10%) as a new upper limit value of the operation amount. On the other hand, in a case in which the actual measured change rate is higher than the target change rate, the operation amount upper limit value setting part 121 sets a value acquired by decreasing the current upper limit value by a predetermined amount (for example, 5% or 10%) as a new upper limit value of the operation amount.

In other words, in the process of arriving at the target temperature, the operation amount upper limit value setting part 121 does not change the setting of the upper limit value as long as the actual measured change rate is within a predetermined range including the target change rate. However, every time the actual measured change rate moves outside the predetermined range including the target change rate, the operation amount upper limit value setting part 121 increases or decreases the upper limit value of the operation amount by a predetermined amount.

In this way, the operation amount upper limit value setting part 121 can update the upper limit value of the operation amount such that the actual measured change rate becomes closer to the target change rate. Then, the operation amount upper limit value setting part 121 outputs the set upper limit value of the operation amount to the AT execution part 122. In other words, the AT execution part 122 receives the latest upper limit value of the operation amount set by the operation amount upper limit value setting part 121.

In addition, in a case in which a plurality of first to N-th (here, N is an integer of two or more) target temperatures are stored in the target temperature storing part 111, when the operation of the heater 20 toward the k-th target temperature is started, the operation amount upper limit value setting part 121 sets the upper limit value set at the time of arrival at the (k−1)-th target temperature as an initial upper limit value for the k-th target temperature.

Figure 4:
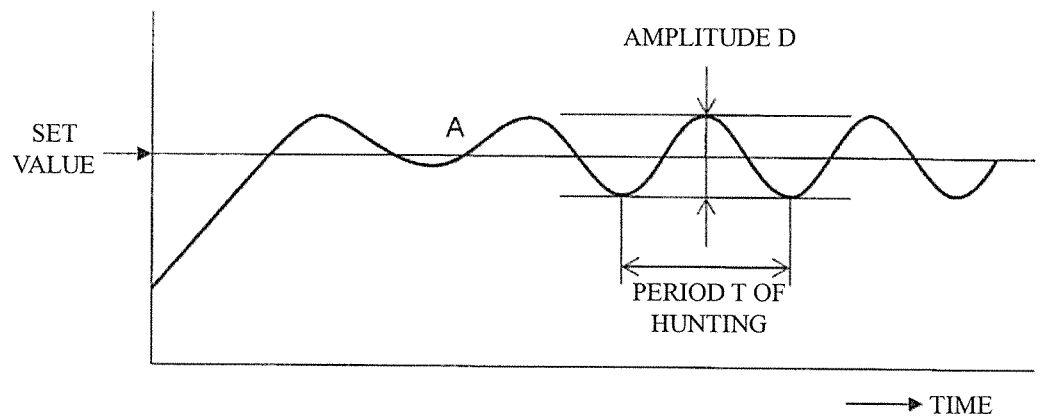
FIG. 4 is a diagram illustrating AT using a limit cycle method according to this embodiment.
Figure 5:
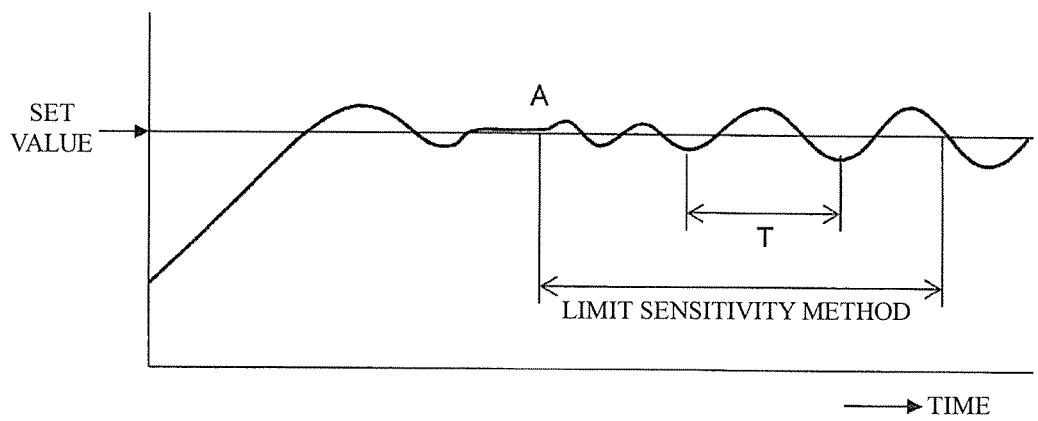
FIG. 5 is a diagram illustrating AT using a limit sensitivity method according to this embodiment.

Next, the PID parameter setting process executed by the parameter setting part 124 will be described. In this embodiment, after the temperature of the heated body 10 arrives at the target temperature, the parameter setting part 124 sets the PID parameters by using the limit cycle method or the limit sensitivity method while the heating processing part 123 operates the heater 20 to maintain the target temperature only during the PID parameter setting period described above. More specifically, in the case of the limit cycle method, as illustrated in FIG. 4, the parameter setting part 124 starts an On/Off operation from a point A and executes control of the heating processing part 123 such that hunting is repeatedly generated and calculates PID parameters from values of the period (T) and the amplitude (D) of the generated hunting. In the case of AT of the limit sensitivity method, as illustrated in FIG. 5, the parameter setting part 124 starts a proportional action from a point A, executes control of the heating processing part 123 such that the width of the proportional band is gradually narrowed and a vibration of the temperature is generated, and calculates PID parameters from the value of the proportional band and the period (T) of the amplitude. The parameter setting part 124 outputs the PID parameters calculated for each target temperature to the control parameter storing part 125 as control parameters to be stored therein.

In the actual temperature control, the PID calculating part 127 executes PID calculation by using the PID parameters stored in the control parameter storing part 125 and the upper limit value and the lower limit value of the operation amount and calculates the amount of power supply for the heater 20 such that the temperature of the heated body 10 is the target temperature stored in the target temperature storing part 111. At this time, in a case in which the target temperature storing part 111 stores first to N-th target temperatures, the PID calculating part 127 first executes the operation of the heater 20 toward the first target temperature by using control parameters corresponding to the first target temperature. Then, at the time of arrival at the (k−1)-th (here, k is an integer of 2 to N) target temperature, the PID calculating part 127 switches the target temperature to the k-th target temperature and executes the operation of the heater 20 toward the k-th target temperature by using control parameters corresponding to the k-th target temperature.

<Specific Example of Auto-tuning>

FIGS. 6A and 6B are diagrams illustrating examples of an AT screen according to this embodiment. FIG. 6A illustrates one example of the AT screen before the execution of the AT process, and FIG. 6B illustrates one example of the AT screen after the execution of the AT process. As illustrated in FIGS. 6A and 6B, on the AT screen, an item of the target temperature, an item of a temperature rise time, items of P (%), I (seconds), and D (seconds), an item of the upper limit value of the operation amount, and the lower limit value of the operation amount are included.

Before the execution of AT, a target temperature input by the user is set in the item of the target temperature, and a target time input by the user is set in the item of the temperature rise time. For example, in a case in which the temperature trajectory as illustrated in FIG. 2 is desired, as illustrated in FIG. 6A, a plurality of target temperatures of 50, 60, 70, and 80° C. are set in the item of the target temperature. In addition, in the item of the temperature rise time, 90 seconds is set for each target temperature. In this embodiment, in the item of the lower limit value of the operation amount, 0% that is a value set in advance is set.

Thereafter, the AT process is executed, and control parameters are set. In other words, while the heating processing part 123 operates the heater 20 such that the temperature of the heated body 10 arrives at the target temperature, the operation amount upper limit value setting part 121 executes a process of updating the upper limit value of the operation amount such that the actual measured change rate is closer to the target change rate. Then, the upper limit value of the operation amount set by the operation amount upper limit value setting part 121 when the temperature of the heated body 10 arrives at the target temperature is set as a control parameter. In addition, in the PID parameter setting period after the temperature of the heated body 10 arrives at the target temperature, PID parameters are set.

Figure 7:
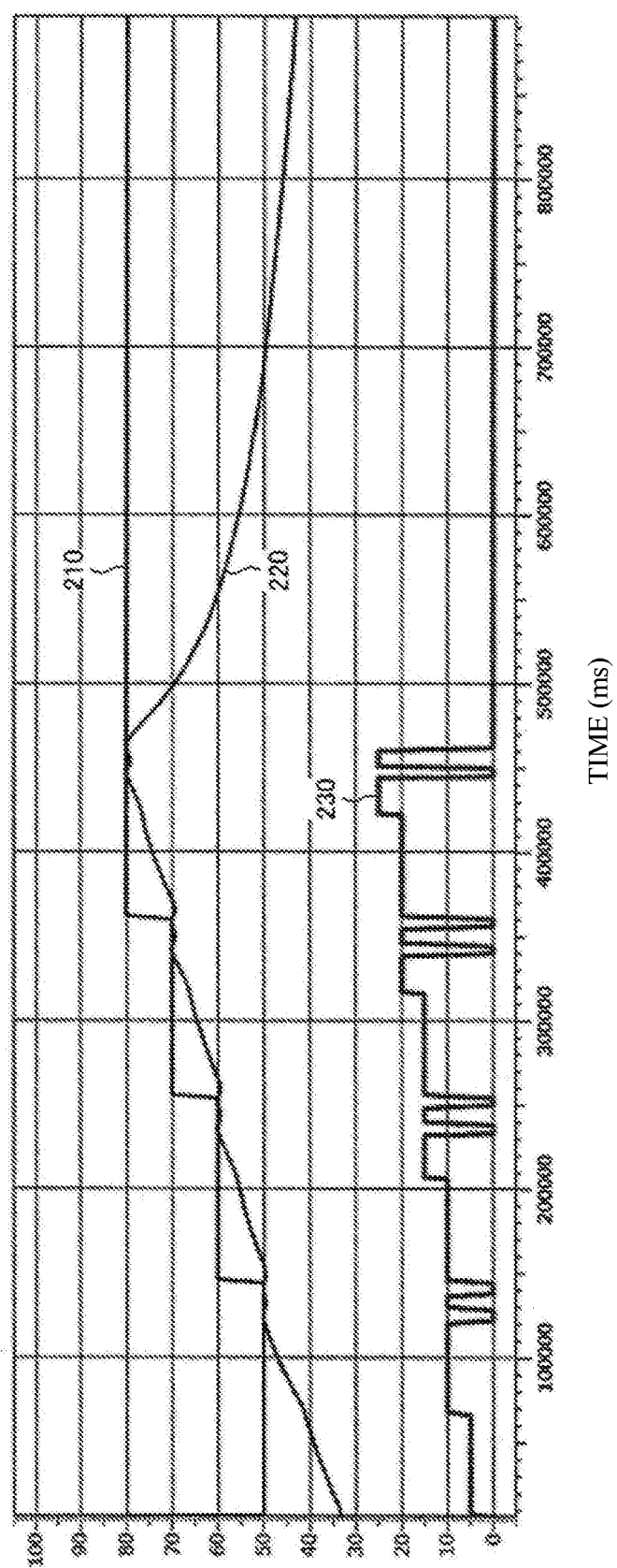
FIG. 7 is a graph representing a temperature change in AT according to this embodiment.

FIG. 7 illustrates one example of a graph representing a temperature change in AT according to this embodiment. In FIG. 7, a waveform 210 represents a change in the target temperature, a waveform 220 represents a change in the actual measured temperature, and a waveform 230 represents the operation amount. Here, the initial operation amount upper limit value storing part 113 stores 5% as the initial operation amount upper limit value, and in a case in which the actual measured change rate is outside the predetermined range including the target change rate, the operation amount upper limit value setting part 121 updates the upper limit value by increasing or decreasing the upper limit value by 5%.

FIG. 7 illustrates waveforms corresponding to the desired temperature trajectory illustrated in FIG. 2 and illustrates AT for a plurality of target temperatures 50, 60, 70, and 80° C.

First, the waveform 220 and the waveform 230 illustrate that the upper limit value is changed from 5% to 10% between the initial state and the target temperature 50° C., and the upper limit value of the operation amount of 10% is set as a control parameter corresponding to the target temperature of 50° C. Then, in the PID parameter setting period in which the target temperature of 50° C. is maintained, the parameter setting part 124 sets a PID parameter calculated using the limit cycle method or the limit sensitivity method as a control parameter corresponding to the target temperature of 50° C.

Thereafter, the waveform 220 and the waveform 230 represent that (a) the operation amount upper limit value is changed from 10% to 15% between 50° C. and the target temperature 60° C., and the upper limit value of the operation amount of 15% is set as a control parameter corresponding to the target temperature of 60° C., (b) the operation amount upper limit value is changed from 15% to 20% between 60° C. and the target temperature 70° C., and the upper limit value of the operation amount of 20% is set as a control parameter corresponding to the target temperature of 70° C., and (c) the operation amount upper limit value is changed from 20% to 25% between 70° C. and the target temperature 80° C., and the upper limit value of the operation amount of 25% is set as a control parameter corresponding to the target temperature of 80° C. In addition, in the PID parameter setting period in which each target temperature is maintained, the PID parameters are set.

The control parameters set in this way are displayed on the AT screen as illustrated in FIG. 6B. In other words, on the AT screen illustrated in FIG. 6B, parameters are newly set to the items of P, I, and D and the item of the upper limit value of the operation amount.

Figures 10A, 10B, 10C:
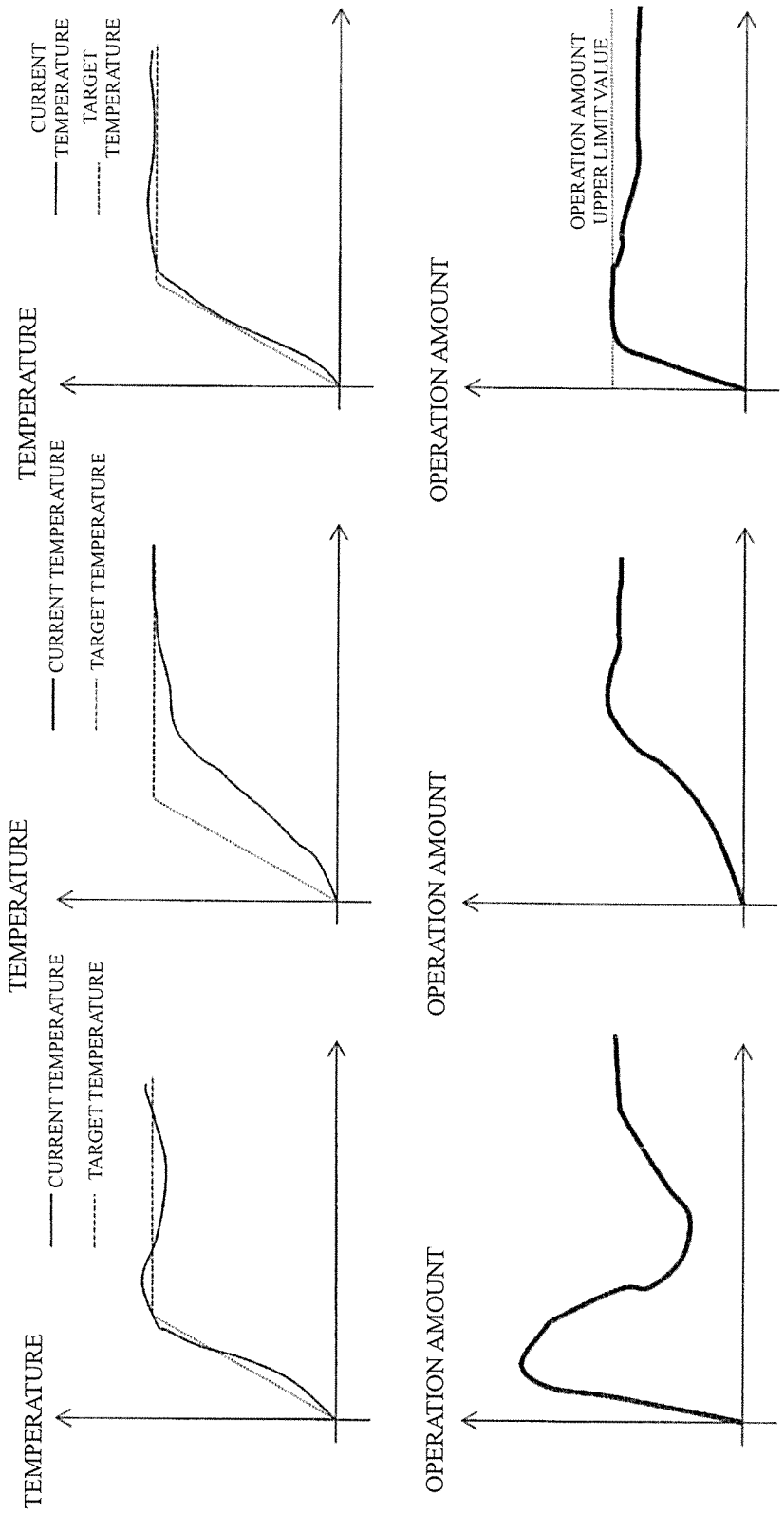
FIGS. 10A to 10C are diagrams illustrating a temperature change when an operation amount is changed.

In this way, when the temperature is actually controlled by using a result of the execution of AT, as illustrated in FIG. 10C, a temperature trajectory that is almost the same as the desired temperature change (temperature trajectory) set by the target temperature and the temperature rise time received on the AT screen as illustrated in FIG. 6A can be acquired.

Here, FIGS. 10A and 10B illustrate temperature changes when the PID parameters are set with the upper limit value of the operation amount set to 100%. FIG. 10A illustrates a temperature change of a case in which the PID parameters are set (more specifically, the P value is set to be small) such that a large operation amount can be acquired in a short time in order to increase the control responsiveness for the target temperature. In this way, it can be understood that the operation amount is hunting and a large overshoot appears.

On the other hand, FIG. 10B illustrates a temperature change of a case in which more conservative PID parameters are set (more specifically, the P value is set to be large) in order to suppress overshoot and hunting. In this case, variations in the operation amount are small, the followability for a desired temperature change is low, and a delay in the rise is seen.

As illustrated in FIGS. 10A and 10B, in a case in which the temperature is controlled using only the PID parameters with the upper limit value of the operation amount being fixed, it is difficult to control the temperature to have a desired temperature trajectory. However, according to this embodiment, the PID parameters are set after the upper limit value of the operation amount is set such that the actual measured change rate is closer to the target change rate. Accordingly, as illustrated in FIG. 10C, the temperature can be controlled to form a desired temperature trajectory.

<Flow of Auto-tuning Process>

Figure 8:
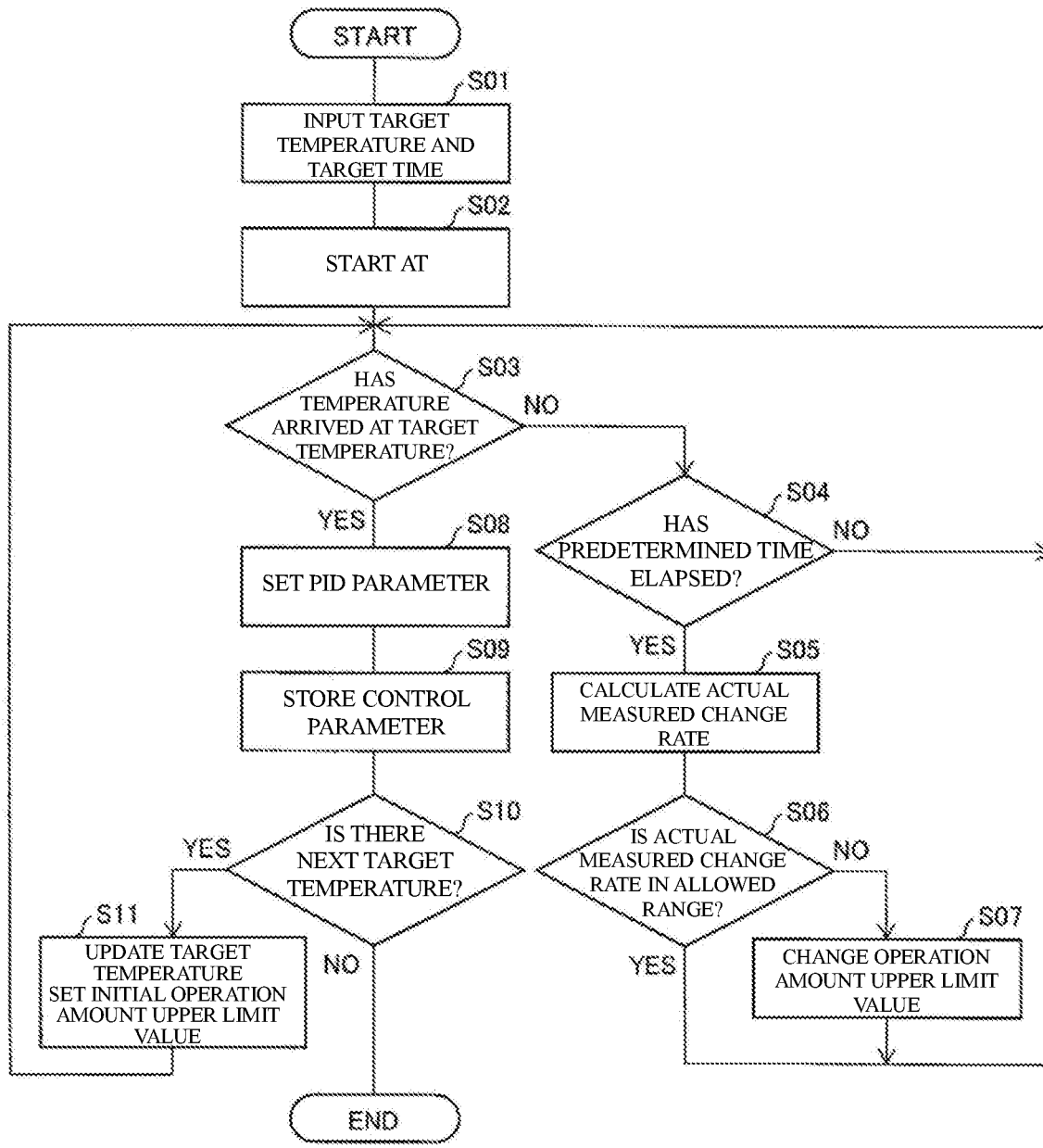
FIG. 8 is a flowchart illustrating one example of the flow of an AT process according to this embodiment.

FIG. 8 is a flowchart illustrating one example the flow of an AT process according to this embodiment. As illustrated in FIG. 8, the target setting part 110 of the temperature control device 100 receives inputs of a target temperature and a target time through the input device 40 (Step S01). Then, the target setting part 110 stores the received target temperature in the target temperature storing part 111 and stores a target change rate calculated from the target temperature and the target time in the target change rate storing part 115. In addition, the target setting part 110 stores a value set in advance in the initial operation amount upper limit value storing part 113 as an initial operation amount upper limit value. In this way, the operation amount upper limit value setting part 121 sets the value stored in the initial operation amount upper limit value storing part 113 as the initial upper limit value and outputs the value to the AT execution part 122.

In the next Step S02, the AT execution part 122 starts the operation of AT. In other words, the heating processing part 123 executes the operation of the heater 20 such that the temperature of the heated body 10 arrives at the target temperature on the basis of the upper limit value output from the operation amount upper limit value setting part 121 and a lower limit value set in advance. Then, it is determined whether or not the temperature has arrived at the target temperature (Step S03). More specifically, in Step S03, it is determined whether or not the temperature has arrived at the target temperature set in Step S02. In a case in which the temperature has arrived at the target temperature set in Step S02, the process proceeds to Step S08. Otherwise, the process proceeds to Step S04. In addition, in a case in which a plurality of target temperatures are stored in the target change rate storing part 115, immediately after the start of the operation of the AT, the heater 20 is operated such that the temperature arrives at the first target temperature in Step S02, and it is determined whether the temperature arrives at the first target temperature in Step S03.

In Step S04, the temperature control device 100 determines whether or not a predetermined time (for example, 20 seconds or one minute) has elapsed. When the predetermined time has elapsed, the process proceeds to Step S05, otherwise, the process is returned to Step S03.

In Step S05, the actual measured change rate calculating part 117 calculates an actual measured change rate by dividing the amount of change in the temperature output from the temperature sensor 30 in the predetermined time by the predetermined time. Then, in Step S06, the temperature change rate comparing part 119 determines whether or not the actual measured change rate is within an allowed range. More specifically, the temperature change rate comparing part 119 determines whether or not the actual measured change rate is within a predetermined range including the target change rate. In a case in which actual measured change rate is within the predetermined range, the process is returned to Step S03, otherwise, the process proceeds to Step S07.

In Step S07, the operation amount upper limit value setting part 121 updates the upper limit value of the operation amount. In addition, in Step S02, at the time of stating the operation of the AT, the value stored in the initial operation amount upper limit value storing part 113 is set, and accordingly, the upper limit value of the operation amount is changed from the setting. On the other hand, in a case in which the upper limit value of the operation amount has already been updated from the value stored in the initial operation amount upper limit value storing part 113, the upper limit value of the operation amount is changed from the value after the previous update. More specifically, in a case in which the actual measured change rate is higher than the target change rate in Step S06, the upper limit value of the operation amount is updated by decreasing the current upper limit value by a predetermined amount. On the other hand, in a case in which the actual measured change rate is lower than the target change rate in Step S06, the upper limit value of the operation amount is updated by increasing the current upper limit value by a predetermined amount.

In this way, before the temperature arrives at the target temperature, the processes of Steps S05 to S07 are repeated at every predetermined time. In this way, the operation amount upper limit value setting part 121 can update the upper limit value of the operation amount such that the actual measured change rate is closer to the target change rate.

In Step S08, the parameter setting part 124 sets PID parameters calculated using the limit cycle method or the limit sensitivity method for the target temperature of Step S03. Then, the PID parameters and the upper limit value of the operation amount set when the temperature arrives at the target temperature are stored in the control parameter storing part 125 as control parameters (Step S09).

In the next Step S10, the temperature control device 100 determines whether or not there is a next target temperature. In a case in which there is a next target temperature, the process proceeds to Step S11, otherwise the AT process ends.

In Step S11, the AT execution part 122 switches the target temperature of the next number. At this time, the operation amount upper limit value setting part 121 sets the upper limit value of the operation amount that is currently set (in other words, the upper limit value of the operation amount set as a control parameter for the previous target temperature) as an initial value, and the process is returned to Step S03. In this way, the process from Step S03 is repeated, and the upper limit value of the operation amount and the PID parameters are stored as control parameters for each target temperature.

MODIFIED EXAMPLE 1

In the description presented above, the target setting part 110 receives a target temperature and a target time from the input device 40. However, the configuration is not limited thereto, and the user may input a target temperature and a target change rate of the temperature with respect to time before the temperature arrives at the target temperature to the input device. In such a case the target setting part 110 may store the target change rate input to the input device 40 in the target change rate storing part 115.

In addition, the user may input the initial value of the upper limit value of the operation amount to the input device 40. In such a case the target setting part 110 may store the initial value input to the input device 40 in the initial operation amount upper limit value storing part 113.

In addition, the temperature control device 100 may include an input part such as a keyboard, a mouse, or the like and may receive a target temperature, a target time, a target change rate from the input part instead of the input device 40.

MODIFIED EXAMPLE 2

Immediately after the start of the operation of the AT process, a rising speed of the temperature according to the heating using the heater 20 is generally low. Thus, for a predetermined time (for example, 40 seconds or two minutes) after the start of the operation of the AT process, the processes of the actual measured change rate calculating part 117 and the temperature change rate comparing part 119 may be omitted. More specifically, when a predetermined time (for example, 20 seconds or one minute) elapses after the heating processing part 123 starts to operate the heater 20 toward the target temperature, the process of each of the actual measured change rate calculating part 117 and the temperature change rate comparing part 119 executed first may be omitted.

In this way, it can be avoided that the upper limit value of the operation amount is increased more than necessary due to a delay in the rise of the temperature immediately after the start of the operation.

In addition, similarly, in a case in which a plurality of target temperatures are stored in the target temperature storing part 111, there is a delay in the rise of the temperature immediately after the target temperature is changed. Thus, after the setting of the control parameters for the (k−1)-th target temperature is completed, for a predetermined time (for example, 40 seconds or two minutes) after the heating processing part 123 starts to operate the heater 20 toward the k-th target temperature, the processes of the actual measured change rate calculating part 117 and the temperature change rate comparing part 119 may be omitted. Also in such a case, when a predetermined time (for example, 20 seconds or one minute) elapses after the heating processing part 123 starts to operate the heater 20 toward the k-th target temperature, the process of each of the actual measured change rate calculating part 117 and the temperature change rate comparing part 119 executed first may be omitted.

In addition, a delay in the rise of the temperature immediately after the start of the AT or immediately after the switching of the target temperature depends on the upper limit value of the operation amount. Thus, the predetermined time in which the processes of the actual measured change rate calculating part 117 and the temperature change rate comparing part 119 are omitted immediately after the start of the AT or immediately after the switching of the target temperature may be changed in accordance with the upper limit value set by the operation amount upper limit value setting part 121. More specifically, the larger the upper limit value is, the shorter the predetermined time may be set.

MODIFIED EXAMPLE 3

In the description presented above, the parameter setting part 124 sets the PID parameter using the limit cycle method or the limit sensitivity method. However, the parameter setting part 124 may set the PID parameter using the step response method.

Figure 9:
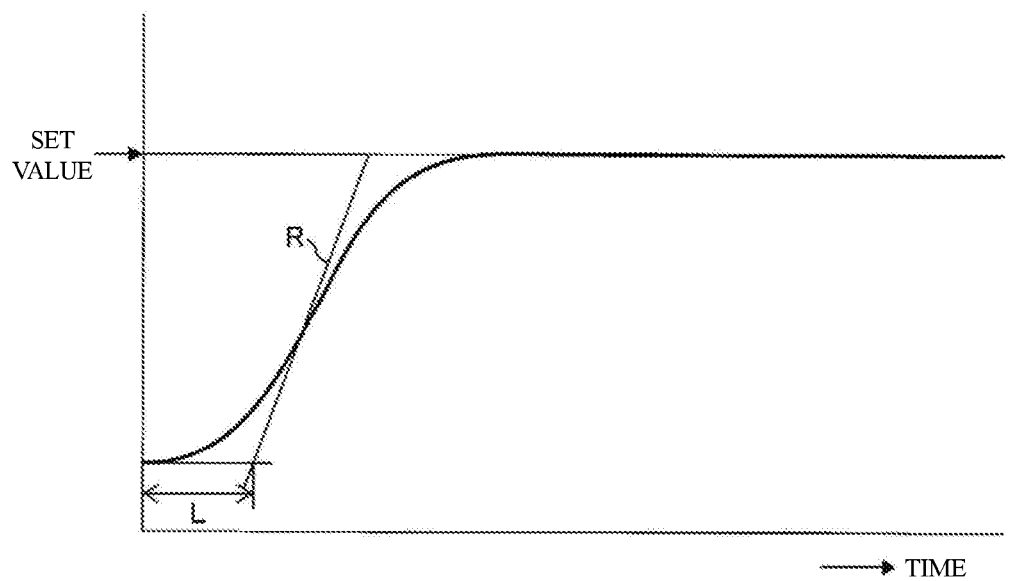
FIG. 9 is a diagram illustrating AT using a step response method according to this embodiment.

In a case in which the parameter setting part 124 sets the PID parameter using the step response method, after the temperature of the heated body 10 arrives at the target temperature, and the upper limit value of the operation amount for the target temperature is set in the control parameter storing part 125, the heating processing part 123 neglects until the temperature becomes the previous target temperature (the initial state in a case in which the temperature arrives at the first target temperature). Then, from the previous target temperature (the initial state in a case in which the temperature arrives at the first target temperature), the heating processing part 123 operates the heater 20 again until the temperature of the heated body 10 arrives at the same target temperature by using the set upper limit value of the operation amount. The parameter setting part 124 sets the PID parameter using the step response method by using a temperature curve at this time. In the case of the step response method, as illustrated in FIG. 9, maximum temperature inclination (R) and a dead time (L) are measured, and the PID parameter is calculated from the values of R and L.

MODIFIED EXAMPLE 4

In the description presented above, the temperature change rate comparing part 119 uses a result of comparison between the actual measured change rate and the target change rate as the deviation amount representing a deviation between the actual measured temperature and the temperature trajectory represented by the target change rate. However, the temperature change rate comparing part 119 may use another parameter as the deviation amount. For example, the temperature change rate comparing part 119 may acquire an ideal temperature at the current time point based on the target change rate and an elapsed time after the start of heating toward the target temperature and use a result (for example, a difference, a ratio, or the like) of comparison between the ideal temperature and the actual measured temperature as the deviation amount.

More specifically, the target temperature and the target time illustrated in FIGS. 6A and 6B are set, and, when 45 seconds elapse after the start of heating toward the target temperature 70° C. from the target temperature 60° C., the temperature change rate comparing part 119 calculates 65° C. as an ideal temperature using the following equation.

$$60 + \{(70-60)/90\} \times 45 = 65$$

Then, the temperature change rate comparing part 119 determines whether or not a difference between the actual measured temperature and the ideal temperature 65° C. is within the range of ±1° C.

In addition, in a case in which information indicating that the deviation amount is outside the predetermined range is input, the operation amount upper limit value setting part 121 may determine whether or not the actual measured temperature is higher than the ideal temperature. In a case in which the actual temperature is lower than the ideal temperature, the operation amount upper limit value setting part 121 sets a value acquired by increasing the current upper limit value by a predetermined amount (for example, 5% or 10%) as a new upper limit value of the operation amount. On the other hand, in a case in which the actual temperature is higher than the ideal temperature, the operation amount upper limit value setting part 121 sets a value acquired by decreasing the current upper limit value by a predetermined amount (for example, 5% or 10%) as a new upper limit value of the operation amount.

(Summary)

As described above, according to the present invention, there is provided a temperature control device that is a temperature control device that controls a temperature of a heated body of a heating system heating the heated body using a heating body in accordance with a control parameter and includes: a target setting part that sets a target temperature and a target change rate of a temperature with respect to time before the temperature arrives at the target temperature; an upper limit value setting part that sets an upper limit value of an operation amount of the heating body; a heating processing part that operates the heating body at the upper limit value set by the upper limit value setting part such that the temperature of the heated body arrives at the target temperature; and a determination part that executes a determination process of determining whether or not a deviation amount representing a deviation between an actual measured temperature of the heated body and a temperature trajectory represented by the target change rate is outside a predetermined range for every predetermined time, wherein the upper limit value setting part sets an initial value set in advance as the upper limit value in a case in which the heating processing part starts an operation of the heating body toward the target temperature and, in a case in which the deviation amount is determined to be outside the predetermined range before the temperature of the heated body arrives at the target temperature, updates the upper limit value such that the deviation amount is decreased, the temperature control device further includes a parameter setting part that sets the upper limit value set by the upper limit value setting part when the temperature of the heated body arrives at the target temperature as the control parameter.

In addition, the initial value set in advance may be a value set by an operator or a value set by the temperature control device when auto-tuning setting control parameters is executed.

In addition, in order to solve the problems described above, there is provided an auto-tuning method that is an auto-tuning method for setting a control parameter used for controlling a temperature of a heated body of a heating system heating the heated body using a heating body and includes: a target setting step in which a target temperature and a target change rate of a temperature with respect to time in a period before the temperature arrives at the target temperature are set; an upper limit value setting step in which an upper limit value of an operation amount of the heating body is set; a heating step in which the heating body is operated at the upper limit value set in the upper limit value setting step such that the temperature of the heated body arrives at the target temperature; and a determination step in which it is determined whether or not a deviation amount representing a deviation between an actual measured temperature of the heated body and a temperature trajectory represented by the target change rate is outside a predetermined range for every predetermined time, wherein, in the upper limit value setting step, in a case in which the heating body is started to be operated toward the target temperature, an initial value set in advance is set as the upper limit value, and, in a case in which the deviation amount is determined to be outside the predetermined range before the temperature of the heated body arrives at the target temperature, the upper limit value is updated such that the deviation amount is decreased, the auto-tuning method further includes a parameter setting step in which the upper limit value set when the temperature of the heated body arrives at the target temperature is set as the control parameter.

According to the configuration described above, the upper limit value setting part updates the upper limit value of the operation amount of the heating body such that a deviation between the actual measured temperature and the temperature trajectory represented by the target change rate is decreased before the temperature of the heated body arrives at the target temperature. Then, the upper limit value set by the upper limit value setting part when the temperature of the heated body arrives at the target temperature is set as a control parameter. For this reason, by operating the heating body using the control parameter, the temperature of the heated body can be controlled to be in the state of being close to the desired temperature trajectory.

In addition, in the temperature control device according to the present invention, it is preferable that the target setting part set first to N-th (here, N is an integer of 2 or more) target temperatures, a first target change rate in a period before the temperature arrives at the first target temperature from an initial state, and a k-th target change rate in a period before the temperature arrives at a k-th target temperature from a (k−1)-th (here, k is an integer of 2 to N) target temperature as the target temperatures and the target change rates, the heating processing part operates the heating body such that the temperature of the heated body arrives at the k-th target temperature after the temperature of the heated body arrives at the (k−1)-th target temperature, the determination part execute a process of determining whether or not a deviation amount representing a deviation between the actual measured temperature and a temperature trajectory represented by an n-th target change rate is outside a predetermined range when the heating processing part operates the heating body toward the n-th (here, n is an integer of 1 to n) target temperature as the determination process, and the parameter setting part set the control parameter for each of the first to N-th target temperatures.

According to the configuration described above, a desired temperature trajectory can be finely set by using a plurality of target temperatures, and the temperature of the heated body can be controlled to be in a state of being further close to the desired temperature trajectory.

In addition, in the temperature control device according to the present invention, it is preferable that the determination part do not execute the determination process in a period before the heating processing part starts to operate the heating body toward the k-th target temperature after the temperature of the heated body arrives at the (k−1)-th target temperature.

According to the configuration described above, in a period until the heating processing part starts to operate the heating body toward the k-th target temperature after the temperature of the heated body arrives at the (k−1)-th target temperature, the upper limit value setting part does not unnecessarily update the upper limit value.

In addition, in the temperature control device according to the present invention, it is preferable that the determination part do not execute the determination process for a predetermined period after the heating processing part starts to operate the heating body toward the k-th target temperature.

Immediately after the target temperature is changed, a rising speed of the temperature of the heated body is low. In other words, there is a delay in the rise of the temperature. According to the configuration described above, since a determination process is not executed for a predetermined period after the heating processing part starts to operate the heating body toward the k-th target temperature, the upper limit value of the operation amount is not updated. For this reason, it can be suppressed that the upper limit value of the operation amount is changed more than necessary due to a delay in the rise in the temperature immediately after the target temperature is changed.

In addition, in the temperature control device according to the present invention, when the heating processing part starts to operate the heating body toward the k-th target temperature after the temperature of the heated body arrives at the (k−1)-th target temperature, the upper limit value setting part preferably sets the upper limit value set as the control parameter for the (k−1)-th target temperature by the parameter setting part as the initial value of the k-th target temperature.

Generally, as the k-th target temperature, a temperature close to the (k−1)-th target temperature is set. For this reason, according to the configuration described above, the number of times of updating the upper limit value executed by the upper limit value setting part before the temperature arrives at the k-th target temperature can be suppressed to be low. As a result, the setting of the upper limit value for the k-th target temperature can be easily executed.

In addition, in the temperature control device according to the present invention, it is preferable that the determination part does not execute the determination process for a predetermined period after the heating processing part starts to operate the heating body.

Immediately after the heating processing part starts to operate the heating body, a rising speed of the temperature of the heated body is low. In other words, there is a delay in the rise of the temperature. According to the configuration described above, since a determination process is not executed for a predetermined period after the heating processing part starts to operate the heating body, the upper limit value of the operation amount is not updated. For this reason, it can be suppressed that the upper limit value of the operation amount is changed more than necessary due to a delay in the rise in the temperature immediately after the heating processing part starts to operate the heating body.

In addition, in the temperature control device according to the present invention, an actual measured change rate calculating part calculating an actual measured change rate of the temperature of the heated body with respect to time on the basis of the actual measured temperature may be further included, and the determination part may set a result of comparison between the actual measured change rate and the target change rate as the deviation amount. Alternatively, the determination part may set a result of comparison between the actual measured temperature and a value calculated on the basis of the target change rate as the deviation amount. Here, the result of comparison, for example, is a difference, a ratio, or the like.

In a case in which a result of comparison between the actual measured change rate and the target change rate is set as the deviation amount, when the deviation amount is determined to be outside the predetermined range, the upper limit value setting part may increase the upper limit value by a predetermined amount in a case in which the actual measured change rate is lower than the target change rate and decrease the upper limit value by a predetermined amount in a case in which the actual measured change rate is higher than the target change rate. In addition, in a case in which a result of comparison between the actual measured temperature and a value calculated on the basis of the target change rate is set as the deviation amount, when the deviation amount is determined to be outside the predetermined range, the upper limit value setting part may increase the upper limit value by a predetermined amount in a case in which the actual measured temperature is lower than an ideal temperature calculated on the basis of the target change rate and decrease the upper limit value by a predetermined amount in a case in which the actual measured temperature is higher than the ideal temperature calculated on the basis of the target change rate.

According to the configuration described above, the upper limit value of the operation amount of the heating body can be set such that a deviation between the actual measured temperature and a temperature trajectory represented by the target change rate is decreased.

In addition, in the temperature control device according to the present invention, the target setting part may receive the target temperature and a target time until the target temperature is arrived from an input device and set the target change rate on the basis of the target temperature and the target time. Alternatively, the target setting part may receive the target temperature and the target change rate from an input device.

In addition, in the temperature control device according to the present invention, the parameter setting part may determine a PID parameter on the basis of a change in the temperature of the heated body at the time of operating the heating body using the upper limit value set as the control parameter and set the determined PID parameter as the control parameter.

According to the configuration described above, the PID parameter is set using the upper limit value of the operation amount set to be close to a desired temperature trajectory, and accordingly, compared to a case in which the PID parameter is set using a fixed upper limit value, the temperature of the heated body can be controlled to be in a state of being closer to the desired temperature trajectory.

In addition, the parameter setting part may determine the PID parameter on the basis of any one of a limit cycle method, a limit sensitivity method, and a step response method.

<Example of Realization Using Software>

The control blocks of the temperature control device 100 (particularly, the target setting part 110, the actual measured change rate calculating part 117, the temperature change rate comparing part 119, the operation amount upper limit value setting part 121, and the AT execution part 122) may be realized by a logic circuit (hardware) formed on an integrated circuit (IC chip) or the like or may be realized by software using a central processing unit (CPU).

In the latter case, the temperature control device 100 includes: a CPU executing a command of a program that is software realizing each function; a read only memory (ROM) or a storage device (these will be referred to as a recording medium) in which the program and various kinds of data are recorded in a computer (or CPU) -readable manner; a random access memory (RAM) expanding the program; and the like. Then, the computer (or the CPU) reads the program described above from the recording medium and executes the read program, whereby the object of the present invention is achieved. As the recoding medium, a non-transitory type medium such as a tape, a disk, a card, a semiconductor memory, a programmable logic circuit, or the like may be used. In addition, the program described above may be supplied to the computer through an arbitrary transmission medium (a communication network or a broadcast wave, or the like) that can transmit the program. Furthermore, one aspect of the present invention may be realized in the form of a carrier wave-embedded data signal in which the program described above is implemented through electronic transmission.

The present invention is not limited to each embodiment described above, various changes can be made in a range represented in the claims, and an embodiment acquired by appropriately combining technical means disclosed in different embodiments also belongs to the technical scope of the present invention.

What is claimed is:

1. A temperature control device that controls a temperature of a heated body of a heating system heating the heated body using a heating body in accordance with a control parameter, the temperature control device comprising:
    a target setting part that sets a target temperature and a target change rate of the temperature of the heated body with respect to time before the temperature of the heated body arrives at the target temperature;
    an upper limit value setting part that sets an upper limit value of an operation amount of the heating body;
    a heating processing part that operates the heating body at the upper limit value set by the upper limit value setting part such that the temperature of the heated body arrives at the target temperature; and
    a determination part that executes a determination process of determining whether or not a deviation amount representing a deviation between an actual measured temperature of the heated body and a temperature trajectory represented by the target change rate is outside a predetermined range for every predetermined time,
    wherein the upper limit value setting part sets an initial value set in advance as the upper limit value in a case in which the heating processing part starts an operation of the heating body toward the target temperature, and in a case in which the deviation amount is determined to be outside the predetermined range before the temperature of the heated body arrives at the target temperature, updates the upper limit value such that the deviation amount is decreased, the temperature control device further comprises: a parameter setting part that sets the upper limit value set by the upper limit value setting part when the temperature of the heated body arrives at the target temperature as the control parameter.

2. The temperature control device according to claim 1,
wherein the target setting part sets a first target temperature to a N-th (N is an integer of 2 or more) target temperature, a first target change rate in a period before the temperature of the heated body arrives at the first target temperature from an initial state, and a k-th target change rate in a period before the temperature of the heated body arrives at a k-th target temperature from a (k−1)-th (k is an integer of 2 to N) target temperature as the target temperature and the target change rate,
wherein the heating processing part operates the heating body such that the temperature of the heated body arrives at the k-th target temperature after the temperature of the heated body arrives at the (k−1)-th target temperature,
wherein the determination part executes a process of determining whether or not the deviation amount representing a deviation between the actual measured temperature and a temperature trajectory represented by an n-th target change rate is outside a predetermined range when the heating processing part operates the heating body toward the n-th (n is an integer of 1 to n) target temperature as the determination process, and
wherein the parameter setting part sets the control parameter for each of the first target temperature to the N-th target temperature.

3. The temperature control device according to claim 2, wherein the determination part does not execute the determination process in a period until the heating processing part starts to operate the heating body toward the k-th target temperature after the temperature of the heated body arrives at the (k−1)-th target temperature.

4. The temperature control device according to claim 3, wherein the determination part does not execute the determination process for a predetermined period after the heating processing part starts to operate the heating body toward the k-th target temperature.

5. The temperature control device according to claim 4, wherein, when the heating processing part starts to operate the heating body toward the k-th target temperature after the temperature of the heated body arrives at the (k−1)-th target temperature, the upper limit value setting part sets the upper limit value set as the control parameter for the (k−1)-th target temperature by the parameter setting part as the initial value of the k-th target temperature.

6. The temperature control device according to claim 3, wherein, when the heating processing part starts to operate the heating body toward the k-th target temperature after the temperature of the heated body arrives at the (k−1)-th target temperature, the upper limit value setting part sets the upper limit value set as the control parameter for the (k−1)-th target temperature by the parameter setting part as the initial value of the k-th target temperature.

7. The temperature control device according to claim 2, wherein the determination part does not execute the determination process for a predetermined period after the heating processing part starts to operate the heating body toward the k-th target temperature.

8. The temperature control device according to claim 7, wherein, when the heating processing part starts to operate the heating body toward the k-th target temperature after the temperature of the heated body arrives at the (k−1)-th target temperature, the upper limit value setting part sets the upper limit value set as the control parameter for the (k−1)-th target temperature by the parameter setting part as the initial value of the k-th target temperature.

9. The temperature control device according to claim 2, wherein, when the heating processing part starts to operate the heating body toward the k-th target temperature after the temperature of the heated body arrives at the (k−1)-th target temperature, the upper limit value setting part sets the upper limit value set as the control parameter for the (k−1)-th target temperature by the parameter setting part as the initial value of the k-th target temperature.

10. The temperature control device according to claim 2, wherein the determination part does not execute the determination process for a predetermined period after the heating processing part starts to operate the heating body.

11. The temperature control device according to claim 1, wherein the determination part does not execute the determination process for a predetermined period after the heating processing part starts to operate the heating body.

12. The temperature control device according to claim 1, further comprising an actual measured change rate calculating part calculating an actual measured change rate of the temperature of the heated body with respect to time on a basis of the actual measured temperature,
wherein the determination part sets a result of comparison between the actual measured change rate and the target change rate as the deviation amount.

13. The temperature control device according to claim 12, wherein, when the deviation amount is determined to be outside the predetermined range, the upper limit value setting part increases the upper limit value by a predetermined amount in a case in which the actual measured change rate is lower than the target change rate and decreases the upper limit value by a predetermined amount in a case in which the actual measured change rate is higher than the target change rate.

14. The temperature control device according to claim 1, wherein the determination part sets a result of comparison between the actual measured temperature and an ideal temperature calculated on a basis of the target change rate as the deviation amount.

15. The temperature control device according to claim 14, wherein, when the deviation amount is determined to be outside the predetermined range, the upper limit value setting part increases the upper limit value by a predetermined amount in a case in which the actual measured temperature is lower than the ideal temperature calculated on the basis of the target change rate and decreases the upper limit value by a predetermined amount in a case in which the actual measured temperature is higher than the ideal temperature calculated on the basis of the target change rate.

16. The temperature control device according to claim 1, wherein the target setting part receives the target temperature and a target time until the target temperature is arrived from an input device and sets the target change rate on a basis of the target temperature and the target time.

17. The temperature control device according to claim 1, wherein the target setting part receives the target temperature and the target change rate from an input device.

18. The temperature control device according to claim 1, wherein the parameter setting part determines a PID parameter on a basis of a change in the temperature of the heated body at the time of operating the heating body using the upper limit value set as the control parameter and sets the determined PID parameter as the control parameter.

19. The temperature control device according to claim 18, wherein the parameter setting part determines the PID parameter on a basis of any one of a limit cycle method, a limit sensitivity method, and a step response method.

20. An auto-tuning method for setting a control parameter used for controlling a temperature of a heated body of a heating system heating the heated body using a heating body, the auto-tuning method comprising:
- a target setting step in which a target temperature and a target change rate of the temperature of the heated body with respect to time in a period before the temperature of the heated body arrives at the target temperature are set;
- an upper limit value setting step in which an upper limit value of an operation amount of the heating body is set;
- a heating step in which the heating body is operated at the upper limit value set in the upper limit value setting step such that the temperature of the heated body arrives at the target temperature; and
- a determination step in which it is determined whether or not a deviation amount representing a deviation between an actual measured temperature of the heated body and a temperature trajectory represented by the target change rate is outside a predetermined range for every predetermined time, wherein, in the upper limit value setting step, in a case in which the heating body is started to be operated toward the target temperature, an initial value set in advance is set as the upper limit value, and in a case in which the deviation amount is determined to be outside the predetermined range before the temperature of the heated body arrives at the target temperature, the upper limit value is updated such that the deviation amount is decreased, the auto-tuning method further comprises: a parameter setting step in which the upper limit value set when the temperature of the heated body arrives at the target temperature is set as the control parameter.

* * * * *